Dec. 7, 1937.    R. F. REED    2,101,322
METHOD AND APPARATUS FOR MEASURING PROPERTIES OF INKS AND THE LIKE
Filed Dec. 24, 1934    2 Sheets-Sheet 1

INVENTOR.
Robert F. Reed
BY
Wood + Wood ATTORNEYS

Dec. 7, 1937. R. F. REED 2,101,322
METHOD AND APPARATUS FOR MEASURING PROPERTIES OF INKS AND THE LIKE
Filed Dec. 24, 1934 2 Sheets-Sheet 2
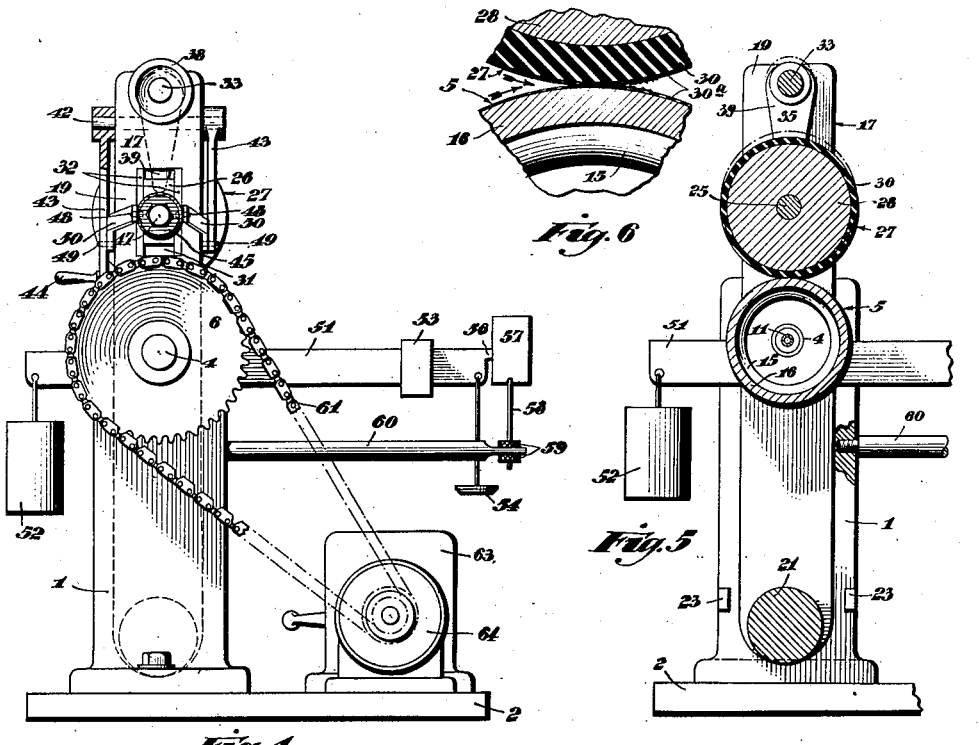
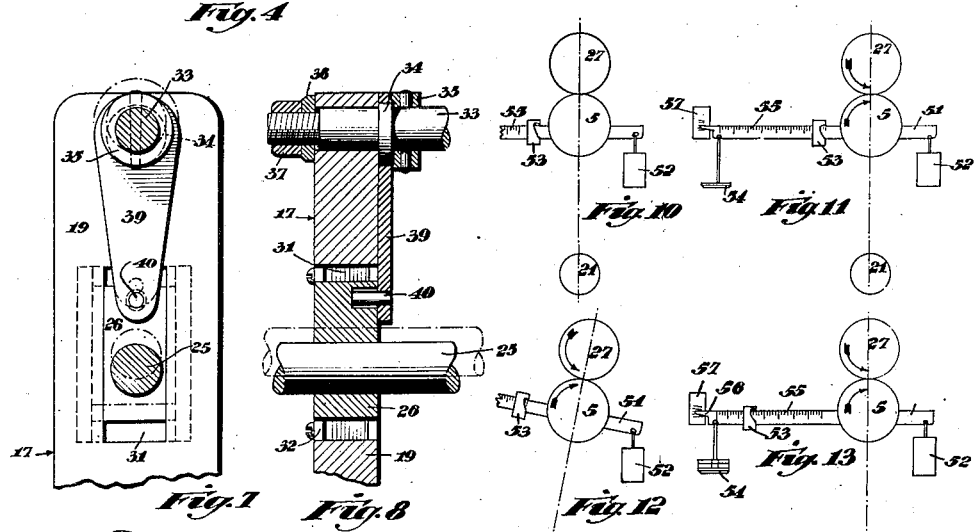
INVENTOR.
Robert F. Reed
BY
Wood+Wood ATTORNEYS Patented Dec. 7, 1937

2,101,322

UNITED STATES PATENT OFFICE 2,101,322

METHOD AND APPARATUS FOR MEASURING PROPERTIES OF INKS AND THE LIKE

Robert F. Reed, Cincinnati, Ohio, assignor to The Lithographic Technical Foundation, Inc., New York, N. Y., a corporation of Delaware Application December 24, 1934, Serial No. 758,998

9 Claims. (Cl. 265—11)

This invention relates to the measurement or consistency of plastic materials and more particularly refers to quantitative measurement of those consistency characteristics of printing and lithographic inks known in the industry as "tack" and "length".

With reference to printing and lithographic inks, "tack" may be defined as the relative degree of stickiness or cohesiveness, or, more specifically, as the resistance to splitting of a thin film of ink, which is demonstrated by the tendency of a sheet of paper to adhere to the form after the printing impression is made. "Length" may be defined as the relative tendency of an ink to flow in a continuous stream or string. Length is the opposite of "shortness".

Evaluation of the tack and length of printing and lithographic inks has heretofore been done by means of finger tests in which an unknown is compared with a known sample. When made by experienced individuals, these comparisons are fairly accurate. However, such evaluations possess the serious drawback that they are purely relative with respect to the known sample and no method of recording them in numerical terms has been found. The finger tests possess the further disadvantage that the known or standard sample is never permanent since inks of the types in question constantly undergo changes in consistency because of chemical reactions and changes in physical structure.

In the arts of printing and lithographing the consistencies of inks are important factors determining the productive capacity of the press and the quality of the printed product. The inability of the printing ink manufacturer to control and standardize the consistencies of inks for use on the various types of presses and for use with different paper stocks is a major cause of production difficulties, inefficiency, and consequent loss to the printing and lithographic industries. In the relatively recent practice of wet multicolor printing, standardization of ink consistencies is essential to the proper "lifting" of successive colors. Lack of a satisfactory means for such standardization has been a drawback to the commercial development of this practice.

The object of this invention is to provide an instrument capable of measuring the tack and length of printing and lithographic inks to eliminate the human element and to yield results in numerical terms for purposes of record.

It is a further object of this invention to provide a method of quantitatively determining tack under constant conditions or variable conditions of speed and/or temperature.

It is a still further object of this invention to provide an instrument which enables an investigator to determine the comparative tack of materials under constant or variable conditions of speed and/or temperature.

Other objects and further advantages will be more fully apparent from a description of the accompanying drawings, in which:

Figure 4 is an end elevation of the instrument showing the driving mechanism.

Figure 5 is a cross sectional elevation taken on the lines 5—5 of Figure 1.

Figure 6 is an enlarged fragmentary view of the rollers in contact taken on the line 6—6 of Figure 1.

Figure 7 is a fragmentary enlarged cross sectional view showing the upper bearing lift arrangement taken on the lines 7—7 of Figure 1.

Figure 8 is a fragmentary enlarged cross sectional view taken on the lines 8—8 of Figure 2.

Figure 9 is an enlarged sectional view taken on the lines 9—9 of Figure 1.

Figures 10, 11, 12 and 13 are diagrammatic views showing the relationship of the rollers and the weight beam during the various stages of use of the instrument.

Figure 1:
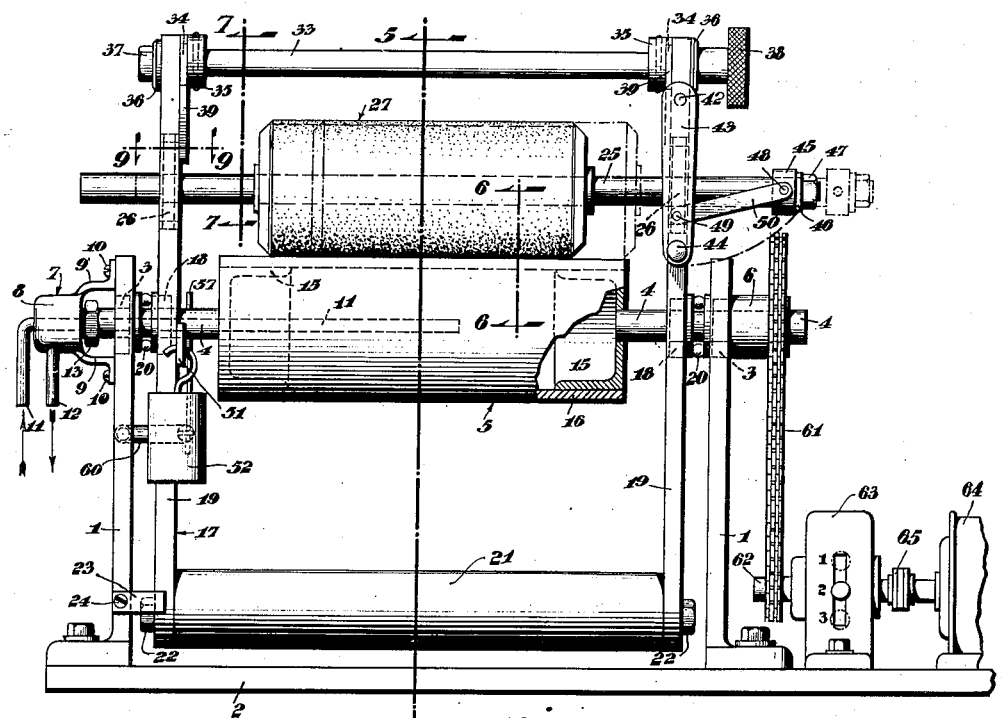
Figure 1 is a front elevation of the instrument.
Figure 2:
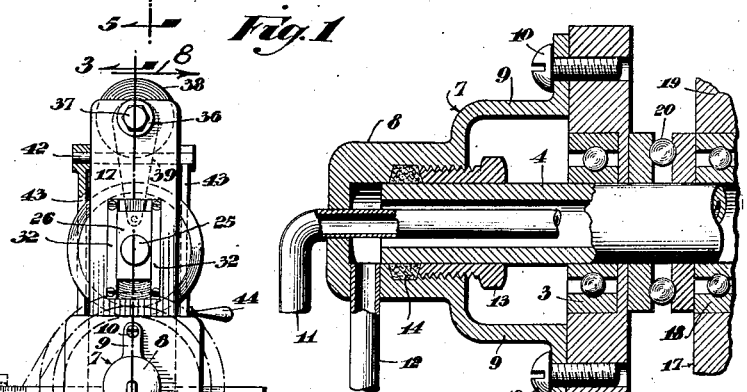
Figure 2 is an end elevation of the instrument showing the relationship of the measuring elements.
Figure 2:
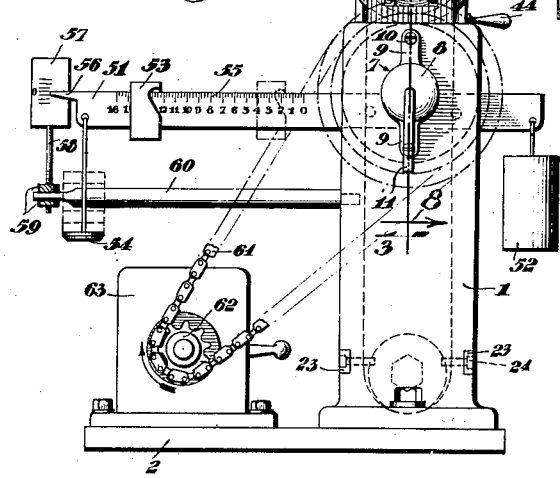
Figure 3:
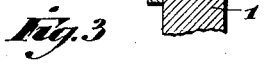
Figure 3 is a fragmentary sectional view of the packing gland taken on the lines 3—3 of Figure 2.

Briefly, the concept and determination upon which the present invention is predicated resides in the discovery that an accurate appraisal of the characteristics of tack and length of printing inks and similar plastic materials is accomplished readily and accurately by measuring the force required to split a film of ink of known dimensions at a constant rate and at constant temperature. Otherwise expressed, the present invention is directed to the method for determining the characteristics of tack and length, and to apparatus adapted to measure these characteristics by measuring the force required to split a film of ink continuously. The force required to split the film at a particular rate of splitting when the ink is held at predetermined temperature is a measurement of the tack of the material comprising the film. When the tack of a particular plastic material is determined at two or more rates of splitting (the temperature remaining constant) and when the results in terms of force are plotted against the rates of splitting corresponding to these particular tack values, the slope of the curve which is thus obtained has been found accurately to indicate the length or the shortness of the ink or plastic body in question.

The apparatus essentially comprises a power driven polished cylindrical roller rotative within a standard carrying said roller, a cradle free to swing about the longitudinal axis of the cylindrical roller, a roller of resilient composition rotatably mounted within the cradle and in tangential contact with the cylindrical roller, and a measuring device adapted to measure the torque transmitted to the cradle when the plastic material subject to investigation is applied as a coating for the rollers.

More specifically, referring to the drawings, a pair of standards 1, 1 are fixedly annexed to a rigid base 2. Located within the standards 1, 1, near the upper terminus thereof, are suitable anti-friction bearings 3, 3. Shafts 4, 4 intermediately carrying a hollow cylinder 5 pass through and extend beyond the bearings 3—3. One of the shafts 4—4, called the driving shaft, carries a rigidly mounted driving sprocket 6. The opposite shaft 4 is hollow and terminates in a packing gland assembly 7 mounted externally on the standard 1. The packing gland assembly 7 comprises a shell portion 8, support bracket portions 9—9, fastening screws 10, 10, a water inlet line 11, a water discharge line 12, and a packing nut 13 threadedly engaged with the shell portion 8.

The inlet line 11, of lesser diameter than the bore through the hollow shaft 4, passes concentrically therethrough and terminates at the mid portion of the cylinder 5. A discharge line 12 is taken from the shell portion 8. A water seal between the gland 7 and the shaft 4 is provided by the usual arrangement of the packing nut 13 concentrically superposed around the shaft 4 in engagement with an enlarged threaded bore of the shell portion 8 and in compressible engagement with suitable packing 14.

It will be understood that any suitable water seal for the shaft 4 is intended to be within the comprehension and scope of this invention.

Concentrically rigidly annexed at the inward termini of the shafts 4, 4 are flanges 15, 15 and extending superposedly therebetween in watertight engagement is a cylinder 16. It is preferable that the cylinder 16 be of a hard material such as steel and that the external surface thereof be accurately ground and polished.

Mounted to rotate about the longitudinal axis of the cylinder 5, preferably between the standards 1, 1, and externally of the confines of the cylinder 5, is a cradle inclusively indicated by 17. Anti-friction bearings 18, 18 engaging the shafts 4, 4 carry side members 19, 19 of the cradle. Anti-friction thrust bearings 20, 20 maintain the side members 19, 19 in spaced relationship to standards 1, 1.

Between the side members 19, 19 of the cradle 17 at the lower terminus thereof, above the base 2, a fixed weight 21 is mounted by means of the bolts 22, 22. Stops 23, 23 mounted on the standards 1, 1 at suitable locations by means of the screws 24 limit the swing of the cradle 17 to predetermined confines.

On a shaft 25, carried by bearing blocks 26, 26 which are slidably mounted in the side members 19, 19, is located a roller 27 at such position as to normally be in tangential, resting contact with the roller 5. The roller 27 is preferably surfaced with a resilient composition 30 such as that used in surfacing printer's rollers. It is further preferable that the respective diameters of the rollers 27 and 5 be different, that is to say precisely, that the roller 27 be larger or smaller in diameter in order that the peripheral distribution of ink on the rollers be automatically provided.

As indicated, the roller 27 comprises a solid cylindrical metal core 28 mounted on or integral with the shaft 25, and covered with a uniform layer of resilient composition 30. It is preferable that the length of the roller 27 be less than the length of the adjacent roller 5.

For cleaning purposes and to prevent indentation of the resilient surface 30 of the roller 27, when the instrument is not in use, an upper roller raising mechanism is provided. The bearing blocks 26, 26 are longitudinally, slidably adjustable in slots 31, 31 of the side members 19, 19 of the cradle. The slots 31, 31 are of greater length than the blocks 26. The blocks 26, 26 are retained within the slotted guideways by guide plates 32.

A shaft 33 extending between and through bores in the side members 19, 19 at the upper ends thereof, carries eccentric collars 34, 34, spacing collars 35, 35 and washers 36, 36, a maintaining nut 37 at one end and a rigidly mounted knurled rotating knob 38 at the opposite end. Embracing the eccentric collars 34, 34 are lift fingers 39, 39 extending downwardly therefrom to carry at the ends pins 40—40 engaged within bores suitably located in the bearing blocks 26—26 respectively. Thus, rotation of the knob 38 causes eccentric collars 34 to lift the fingers 39, which through the pins 40, lift the blocks 26 and thus raise roll 27 from contact with roll 5.

To provide even lateral distribution of ink across the entire surfaces of the co-acting rollers 5 and 27, a longitudinal displacement linkage is provided. The shaft 25 is free to move longitudinally within the bearings 26. Extending transversely through a bore in one side member 19, preferably near the upper terminus thereof, is a rotatably mounted pin 42 carrying rigidly annexed levers 43, 43, one of said levers additionally carrying a handle 44.

On a counter-turned portion at one end of shaft 25 is carried a rotatable collar 45, maintained to the shaft by a washer 46 and a nut 47. The collar carries pins 48—48, and the levers 43—43 carry pins 49—49 (see Figures 1 and 4). Connecting the two respectively are cross links 50—50. Movement of the lever arm 43 through the indicated linkage causes corresponding lateral movement of the roller 27 with respect to the roller 5.

Measurement of torque tending to cause angular rotational displacement of the roller 27 with respect to the roller 5 is accomplished by the use of a measuring apparatus comprising a graduated beam 51 fixedly annexed to one side member 19 of the cradle 17, a weight 52 suspended from one end of the beam 51 at a suitable distance for balance purposes, and an adjustable weight 53 slidably mounted on the beam 51 oppositely to the weight 52, and an auxiliary fixed weight pan 54.

The weight 52 may be fixed if the force components of the entire cradle system are known or the weight 52 may be adjustable as to magnitude by making the same hollow for the reception of lead shot or similar material. This weight, if the magnitude of the other weights acting on the cradle are known, is intended to statically balance the weight system at the time that the rollers are in contact without applied ink and at the time that the adjustable weight 53 is rested at the zero position on the scale 55 at the beam 51.

Beam 51 is graduated, as at 55, in suitable scale proportions and terminates in the elongated pointer portion 56. Pointer 56 is adjacent to and in comparing relationship with a reference scale 57, which is carried by a standard 58 adjustably mounted by means of the lock nuts 59 to a support arm 60 fixedly annexed to standard 1 so as to be stationary. The reference scale 57, it will be understood, can be mounted in any suitable stationary manner.

The cradle carrying the roller 27, the weight 21, the beam 51 and the appended weights 52 and 53 is mounted to rotate about the shaft 4. It is preferable that the center of gravity of the cradle and all of the appendages be below the longitudinal axis of the shaft 4 so that the same will come to rest in a vertical position when the applied torque from the roller 5 is counterbalanced. The beam 51 is therefore mounted to one cradle side member 19 preferably so that the top edge of the beam lies in a plane with the longitudinal axis of the shaft 4. In this manner the statically balanced cradle will come to rest in a vertical position.

The term "statically balanced" is used in this disclosure to indicate the relationship of the force components acting on the cradle when the rollers are not in motion. The term "dynamic balance" is intended in this disclosure to designate the balance of the cradle while the rollers are in motion. Thus after a film of ink is applied to the rotating roller 5, the cradle will assume an angular position deviating from its vertical position of rest and the counterweights may then be adjusted to restore the cradle system to the vertical position in which it may be said the cradle is dynamically balanced, and in which the amount of the applied force is an indication of the torque tending to rotate the cradle.

Rotation is imparted to the cylinder 5, and frictionally to the cylinder 27, by means of a driving mechanism comprising a silent chain 61 in engagement with the sprocket wheel 6 and a driving sprocket 62 of a variable speed transmission 63 driven by a motor 64 through the coupling 65. For purposes of speed adjustment a multiple speed driving transmission is preferable.

*Mode of operation*

In putting the device into operation, the clean roller 27 is lowered into resting contact with the clean, polished roller 5. Thermo-regulated water is admitted through the line 11 to the roller 5 to maintain this roller at a constant, predetermined temperature. The motor 64 is started and the roller 5 is driven at a constant predetermined speed, the value of which is attained by selection of the proper speed at the speed box 63.

It is preferable that the weights balancing the cradle be adjusted so that the pointer 56 reads zero on the scale 57, when the weight 53 is at the zero position on the scale 55, when no weights are on the pan 54, and when no ink is applied to the roller 5. This condition may be obtained by the addition of shot to the weight 52, or the weight 52 may be of fixed magnitude once the cradle under the above conditions has been dynamically balanced.

The volume of plastic material to be tested, calculated to provide a film of plastic material of known thickness, on both rollers, is applied to the surface of the polished roller 5 and laterally distributed while the rollers are in rotation by providing lateral motion to the roller 27 by movement of the handle 44. Figure 6 is intended to illustrate the plastic material of known thickness applied to the roller 5, the plastic material being indicated by 30ª. When the material is applied, the roller 27, in addition to being rotated about its own axis by the roller 5, also tends to rotate the entire cradle about the axis of the roller 5, the stops 24, of course, limiting the amount of rotation.

With the temperature of the roller 5 being maintained constantly at a predetermined value, the slidable weight 53 is adjusted to again bring the cradle into position so that the pointer 56 comes to rest at the zero point of the reference scale 57. Multiple weights are added to the weight pan 54 if necessary. A final reading of the position of the slidable weight with respect to the scale is taken and noted. The moment of the slidable weight, which is the scale reading, plus the moments of any weights added to weight pan 54, represents the moment or torque transmitted to the cradle, which is a measure of the force required to split the film of plastic material covering the rollers, at the existing speed of rotation and temperature.

To illustrate further, Figure 10 indicates the machine at rest. Figure 11 indicates the rollers rotating in contact without any plastic material applied, the weight 52 being adjusted to statically balance the system. Figure 11 indicates the conditions of adjustment immediately prior to making a test which serve to balance and thereby cancel all irrelevant frictional torque. Figure 12 indicates the rotation of the cradle produced by the drag or friction of the plastic material after the plastic material has been applied to the rollers. Figure 13 indicates the system again in static balance accomplished by the adjustment of the weight 53 and is indicative of the conditions under which the final reading is taken.

It will be noted that all frictional moments except that caused by the plastic film, are cancelled by the initial zero adjustment. A reading of torque taken at any given speed and temperature is a measure of the "tack" of the plastic film under these conditions. When torque readings are taken on the same film of plastic material at two or more different speeds, the temperature remaining constant, the relationship between the values obtained is indicative of the "length" of the plastic material. Values of "tack" and "length" taken in conjunction define the body or consistency of the plastic material.

The graduations of scale 55 may be arbitrary graduations or may be such that the final torque values are determinable in gram centimeters, ounce inches, or foot pounds, the product serving in any case as a reference value determined on one particular plastic material whereby its plastic characteristics may be compared with those of similar materials.

Having described my invention, I desire to be limited only by the following claims:

1. In a device of the class described, a base and a pair of standards mounted thereon, a roller rotating substantially frictionlessly within said standards, means for controlling the temperature of said roller, a cradle mounted to rotate substantially frictionlessly about the axis of said first roller, said cradle comprising, a second roller normally in resting tangential contact with said first roller, cradle side members carrying said second roller, counterweights carried by the side members of said cradle, means for axially moving said second roller, means for disrupting the contact of the rollers, and a graduated beam and adjustable weight adapted to accurately dynamically balance the cradle.

2. A device for quantitatively measuring the tack and length of a plastic material, comprising, a driving roller having a hard surface and a driven roller having a resilient surface, the driving roller and the driven roller being in tangential contact with the driven roller being free to rotate about the axis of the driving roller, and an indicating device adapted to measure the torque tending to drag the second roller about the first roller when a film of plastic material of known cross sectional area is applied between the rollers and is being split continuously therebetween through roller coaction.

3. In an instrument of the class described, a rotatable roller adapted to receive ink or the like, means for driving said roller, means for maintaining the temperature of the roller constant, a second roller axially movable with respect to said first roller, a cradle rotatively carrying said second roller and free to translate about the axis of said first roller when said second roller rests in tangential contact on said first roller and said first roller is rotated, and means for measuring the torque applied to the said second roller by a film of ink of known cross sectional area being continuously split by the conjoint operation of the rollers when in tangential contact.

4. In a device of the class described, a roller rotatable at a predetermined speed and adapted to receive a film of plastic material, means for driving said roller, a second roller in resting tangential contact with said first roller, rotatable on its own longitudinal axis and also rotatable about the longitudinal axis of the first roller, and adapted to pick up part of a film of plastic material when same is applied to the first roller, and an indicator device adapted to indicate rotation of the second roller about the axis of the first roller and thus indicate torque tending to drive the first roller about the second, said indicating device being normally balanced to a given position when the first roller drives the second at the time no film of plastic material is applied, and likewise balanceable when plastic material of known cross sectional area is applied to the first roller and transferred to the second, whereby the torque required to spread the film of plastic material may be measured.

5. In a device of the class described, the combination of a rotatable roll having a relatively hard surface, means for effecting its rotation, a second rotatable roll having a relatively resilient surface, the second roll in tangential alignment and contact with said first roll and free to translate about the first of said rolls when the same is rotated, and means for measuring the degree of such translation when a film of plastic material is placed between the rolls and one of said rolls is rotated, the driving roller driving the driven roller through said film of plastic material continuously being split therebetween.

6. In a device of the class described, a driving roller, a roller in contact with said driving roller to be driven, a cradle supported on the axis of the driving roller and rotatably supporting the driven roller, said cradle permitting the driven roller to rotate about the axis of the driving roller, the one of said rollers having a relatively hard surface and the other of said rollers having a relatively resilient surface, and a torque measuring device associated with the cradle, whereby when a plastic material is placed on the rollers the action of the driving roller tending to drag the axis of the driven roller around its axis is conveyed to the torque measuring device which indicates the proportionate tack and length of the plastic material.

7. A machine for measuring the force required to split a film of printer's ink or like plastic substance, which machine comprises a rotatable roller, having a relatively hard surface, adapted to receive a film of said material upon its periphery, a cradle mounted for rocking rotation on an axis coincident with the axis of said roller, a second roller, having a relatively resilient surface, mounted in said cradle for rotating coaction with said first roller through a film of material applied thereon, whereby said film between said rollers is split continuously during rotation, the splitting causing translating rotation of said second roller about the first, and scale beam means associated with said cradle for counteracting and measuring the force causing translating rotation.

8. An instrument for measuring the tack of plastic materials, comprising, a driving roller having a hard surface, a driven roller having a resilient surface, support means for said driven roller mounted for translation about the axis of said driving roller and rotatively carrying said driven roller in resting alignment therewith, means for effecting rotation of said driving roller, and an indicating device associated with said support means for measuring the torque tending to rotate the driven roller about the axis of the driving roller when a film of plastic material such as printing ink is being split continuously through roller coaction.

9. The method of determining the characteristics of printing ink, comprising spreading a quantity of printing ink over contacting bodies of a predetermined area, to produce a film of ink therebetween, separating the bodies to split the film while measuring the force required to produce such separation as an index of the tackiness of the ink.

ROBERT F. REED.